United States Patent
Beringer

(10) Patent No.: US 7,651,174 B2
(45) Date of Patent: Jan. 26, 2010

(54) PRESSURE LIMITING DEVICE FOR A HYDRAULIC BRAKING CIRCUIT OF VEHICLE

(75) Inventor: Gilbert Beringer, Chatelneuf (FR)

(73) Assignee: SA Beringer, Chatelneuf (FR)

( * ) Notice: Subject to any disclaimer, the term of this patent is extended or adjusted under 35 U.S.C. 154(b) by 445 days.

(21) Appl. No.: 10/577,169

(22) PCT Filed: Oct. 27, 2004

(86) PCT No.: PCT/FR2004/050538

§ 371 (c)(1),
(2), (4) Date: Apr. 26, 2006

(87) PCT Pub. No.: WO2005/042324

PCT Pub. Date: May 12, 2005

(65) Prior Publication Data

US 2007/0069575 A1    Mar. 29, 2007

(30) Foreign Application Priority Data

Oct. 29, 2003    (FR) .................................. 03 12952

(51) Int. Cl.
  *B60T 13/00*    (2006.01)
(52) U.S. Cl. .................... 303/9.75; 303/9.71; 303/113.5
(58) Field of Classification Search ................. 303/9.75, 303/9.71, 9.72, 9.62, 84.1, 84.2, 113.5, 900, 303/901; 188/349; 137/505.13, 505.18
See application file for complete search history.

(56) References Cited

U.S. PATENT DOCUMENTS

| 3,213,887 | A | * | 10/1965 | Angelery | 137/630.15 |
|---|---|---|---|---|---|
| 3,245,729 | A | * | 4/1966 | Shellhause | 303/9.68 |
| 3,304,128 | A | * | 2/1967 | Farr | 303/9.74 |
| 3,680,922 | A | * | 8/1972 | Kawai | 303/9.73 |
| 3,773,362 | A | * | 11/1973 | Lewis | 303/9.67 |
| 3,906,991 | A | * | 9/1975 | Haussler | 137/630.13 |
| 3,989,312 | A | * | 11/1976 | Unterberg | 303/9.69 |
| 4,265,490 | A |   | 5/1981 | Burgdorf | 303/6 C |
| 5,741,049 | A | * | 4/1998 | Sorensen | 303/9.75 |

FOREIGN PATENT DOCUMENTS

| DE | 28 36 453 | 3/1980 |
|---|---|---|
| DE | 28 53 718 | 7/1980 |
| DE | 32 36 321 | 4/1984 |
| EP | 0 370 230 | 5/1990 |
| GB | 1 081 997 | 9/1967 |
| GB | 2 038 433 | 7/1980 |
| GB | 2 127 508 | 4/1984 |

* cited by examiner

*Primary Examiner*—Xuan Lan Nguyen
(74) *Attorney, Agent, or Firm*—Heslin Rothenberg Farley & Mesiti P.C.

(57) ABSTRACT

The device comprises a leaktight housing which is hydraulically connected between braking elements of the front and rear wheel(s). The housing comprises a body and fittings which enable the hydraulic fluid to flow into the braking elements of the rear wheels until an adjustable set pressure is obtained, after which the pressure is reduced in the braking elements of the rear wheel(s) in a manner which is proportional to the pressure increase in the braking elements of the front wheel(s).

7 Claims, 3 Drawing Sheets

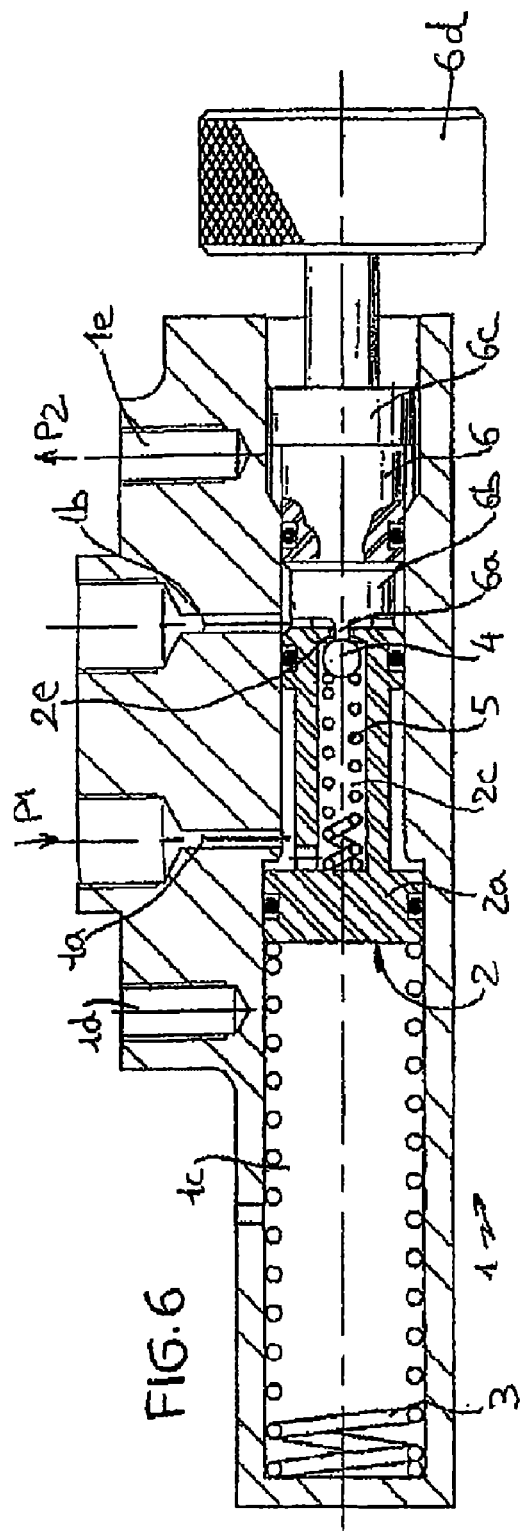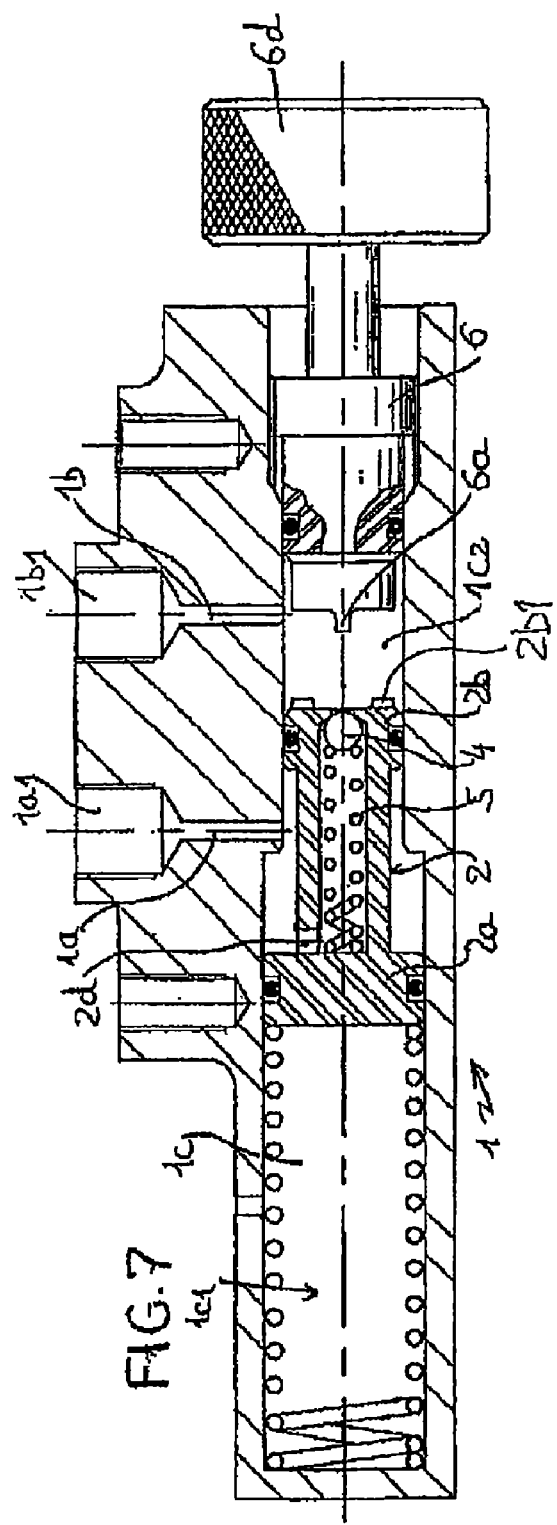

PRESSURE LIMITING DEVICE FOR A HYDRAULIC BRAKING CIRCUIT OF VEHICLE

CROSS-REFERENCE TO RELATED APPLICATIONS

This application is a 35 U.S.C. 371 filing of International Application PCT/FR2004/050538 filed on Oct. 27, 2004 and published, in French, as International Publication WO 2005/042324 A2 on May 12, 2005, which claims priority from French application no. 0312952 filed on Oct. 29, 2003, which applications are incorporated herein by reference in their entirety.

BACKGROUND OF THE INVENTION

The invention relates to the sector of braking control circuits for all types of vehicle, particularly automobiles and motorcycles.

As stated, the invention has particularly advantageous applications in the hydraulic braking circuits of vehicles where force must be applied to an actuating component such as a handle or pedal to deliver pressure capable of acting on the braking components. This type of application must not, however, be considered as strictly limitative.

It is known by those skilled in the art that braking components, particularly calipers, are fitted with pads controlled by pistons that are hydraulically linked to a master cylinder controlled by one or more actuating components that can be moved with the hand or foot depending on the type of vehicle concerned. It is also known that the act of braking, which consists of a deceleration, causes the transfer of mass to the front of the vehicle such that there tends to be loss of weight at the rear of the vehicle that is capable of causing breakaway such as that found in motorcycles.

FIG. 1 shows the iso-adhesion curve of an ideal theoretical braking as a function of the pressure exerted on the front wheel or wheels (Y-axis) relative to the pressure exerted on the back wheel or wheels (X-axis). This curve shows that there is a rise in pressure in the braking components of the back wheel or wheels which is followed by a progressive drop as pressure is released in the said braking components.

In actual fact, when the user uses the actuating components there is a rise in pressure that results in the theoretical curve being exceeded, resulting in one or more of the back wheels locking.

To attempt to overcome these drawbacks, pressure limiters have been proposed for inclusion in the control circuits of the braking components of the rear wheel or wheels, the primary function of which is to limit the rise in pressure but which do not cause it to drop progressively. At best such pressure limiters make it possible to maintain this pressure at a constant level on a plateau that appears at the maximum of the theoretical curve. Moreover, such limiters are sensitive to the speed at which pressure rises. There is therefore significant dispersion of the set pressure according to the speed at which pressure rises in the circuit.

BRIEF SUMMARY OF THE INVENTION

The goal of the invention is to overcome these drawbacks simply, safely, effectively and rationally.

The problem the invention sets out to solve is, firstly, to overcome the variations in the speed at which pressure rises and, secondly to cause the pressure in the braking circuit of the back wheel or wheels of the vehicle to drop.

To overcome this problem a pressure limiting device for the hydraulic braking circuit of a vehicle has been designed that comprises a leaktight housing hydraulically connected between the braking components of the front wheel or wheels and the back wheel or wheels, the said housing having means and arrangements capable of allowing the hydraulic fluid to flow into the braking components of the back wheels until an adjustable pressure is reached and of then releasing this pressure which decreases in the said braking components of the back wheel or wheels in proportion to a rise in pressure in the braking components of the front wheel or wheels.

To solve the problem tackled of causing the pressure in the braking components of the back wheel or wheels to drop progressively, the means consist of a hollow cylindrical body having at each end a piston head that slides in a leaktight manner inside a bore in the housing, the said body having arrangements allowing the free passage of the fluid from the braking components of the front wheels to the braking components of the back wheels and, when the set pressure is reached displacing it to prevent the fluid passing into the braking components of the back wheel or wheels in order to increase the pressure in the braking components of the front wheels in proportion.

To solve the problem tackled of allowing the free flow of hydraulic fluid resulting from the rise in pressure and then, as from the set pressure, allowing reduction of this pressure in the braking components of the back wheel or wheels, the arrangements in the body consist of a coaxial bore that opens out of one of the piston heads on the side where the hydraulic circuit of the braking components of the back wheel or wheels is connected, the said bore, which communicates with the fluid coming from the braking components of the front wheel or wheels, being fitted with a ball controlled by a spring that co-operates with a coaxial finger of a leaktight closure component fitted in the bore in the housing such that, depending on the set pressure, the fluid can flow freely or the entire body-piston assembly can move.

Advantageously the fluid from the braking components of the front wheel or wheels is routed into the bore in the housing between the two piston heads that define a ring-shaped chamber and is sent to the braking components of the back wheels between the end of the piston head and the closure component.

To solve the problem tackled of allowing the free flow of fluid to the braking components of the back wheel or wheels, the surface of the piston head located on the side of the closure component is fitted with pins capable of bearing on the said closure component when the ball abuts against the finger.

To solve the problem tackled of reducing the pressure in the braking components of the back wheel or wheels and of causing such pressure to drop, the body-piston assembly is controlled by an elastic component fitted inside the bore in the housing and capable of exercising pressure to hold the said body against the closure component allowing the free passage of the fluid, the said elastic component being pre-stressed to a value matching the set pressure.

In a preferred embodiment the closure component is fitted into the bore in the housing with the capacity to adjust its translation movement in order to make it possible to adjust the pre-stress on the elastic component, thereby concomitantly modifying the set pressure.

In the light of the problem tackled, in a preferred embodiment the piston head, co-operating with the pre-stressed elastic component, has a larger diameter than the other head, the bore in the housing defining two coaxial internal bearings of different, corresponding diameters.

Other versions of this basic design can be envisaged:

For example, in one embodiment the piston head that co-operates with the pre-stressed elastic component has a diameter that is smaller than that of the other head, the bore in the housing defining two coaxial internal bearings of different, corresponding diameters.

In an alternative embodiment the piston head that co-operates with the pre-stressed elastic component has a diameter that is the same as that of the other head, the bore in the housing defining an internal bearing of a corresponding diameter.

BRIEF SUMMARY OF THE DRAWING FIGURES

The invention is described in greater detail below with references to the attached drawings wherein:

FIG. 6 is a longitudinal cross-section of the limiting device shown in the position in which the fluid can flow where the pressure exerted on the braking components of the back wheel or wheels is less than that of the selected set pressure;

FIG. 7 is the same view as that of FIG. 6 in which the pressure exerted on the braking components of the back wheel or wheels is greater than that of the selected set pressure.

DETAILED DESCRIPTION

Figure 1:
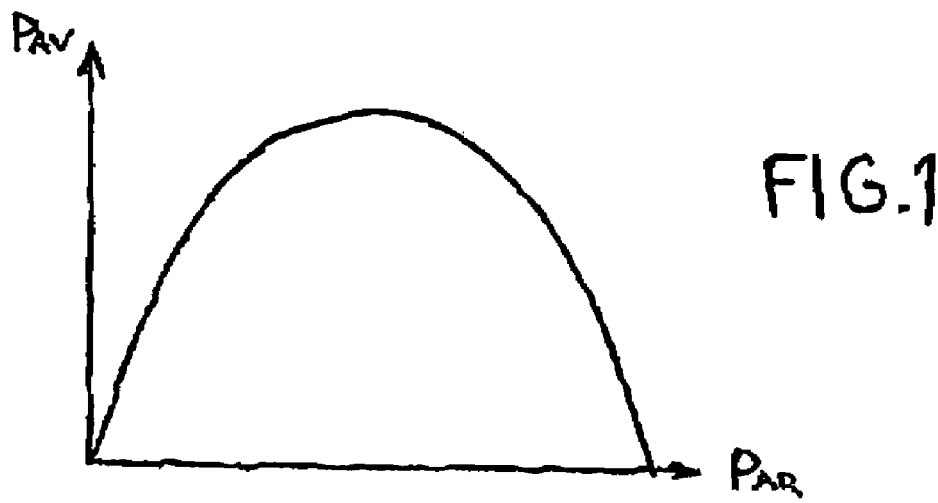
FIG. 1 shows the theoretical iso-adhesion curve of an ideal braking.
Figure 5:
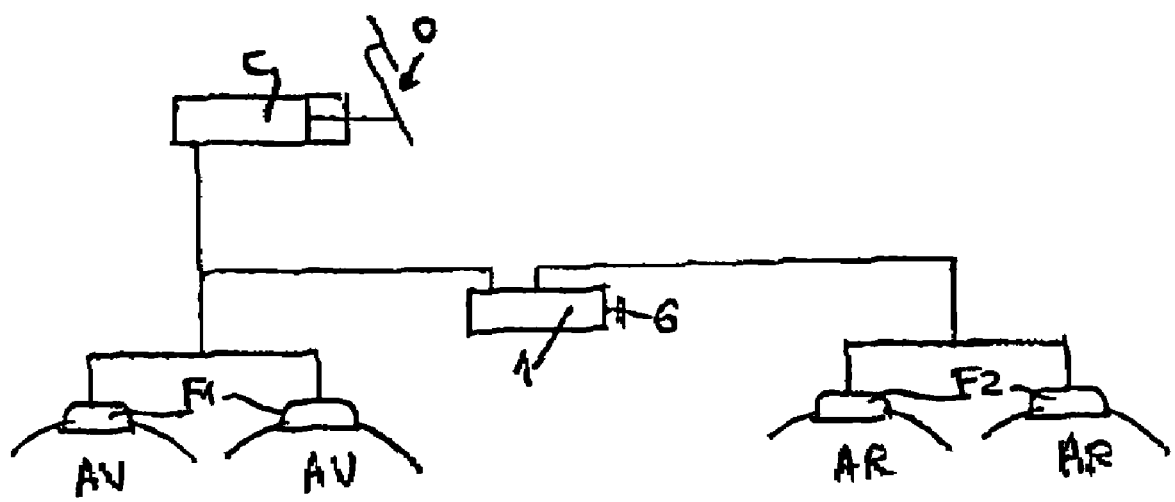
FIG. 5 is a purely schematic view showing the assembly of the pressure limiting device in the hydraulic braking circuit of a vehicle.

The pressure limiting device of the invention comprises a small leaktight housing (1) capable of being included or added to a hydraulic circuit designed to control braking components. As seen in FIG. 5, the pressure limiter is hydraulically connected between the braking components (F1) of the front wheel or wheels (AV) and the braking components (F2) of the back wheel or wheels (AR). In standard ways that are well known to those skilled in the art, the braking components (F1) and (F2) are controlled by a master cylinder (C) that is controlled by the actuating component (O) that may be a pedal, handle or other depending on the type of vehicle to be equipped.

The housing (1) constitutes a compact, independent assembly that is shaped roughly like a rectangular box. The walls of the housing (1) contain channels (1a) and (1b) that communicate with a connection bearing (1a1), (1b1) to connect up with the hydraulic braking circuit. This connection can, for example, be achieved by means of hoses. Channel (1a) is connected to the hydraulic circuit of the braking components (F1) of the front wheel or wheels (AV) while channel (1b) is connected to the hydraulic circuit of the braking components (F2) of the back wheel or wheels (AR). Channels (1a) and (1b) are connected to a bore (1c) that is coaxial with the housing (1). Clearly the housing (1) has arrangements (1d) and (1e) so that it can be fastened by screws or otherwise onto part of the vehicle concerned.

According to one aspect of the invention, the bore (1c) of the housing (1) receives a hollow, cylindrical body (2) that slides in a leaktight manner inside the bore, the said body having a piston head (2a) and (2b) at either end. Significantly, as will be explained later in the description, the body-pistons assembly (2) is controlled by an elastic component, namely a pre-stressed spring (3) fitted into the bottom of the bore (1c).

The cylindrical body (2) includes a coaxial bore (2c) that opens out of piston head (2b) on the side of the channel (1b) connected to the hydraulic circuit of the braking components (F2) of the back wheel or wheels (AR). This bore (2c) is connected via an aperture (2d) to the fluid coming from the braking components (1) of the front wheel or wheels (AV). This bore (2c) receives a ball (4) controlled by a spring (5) fitted into the bottom of the bore (2c). The ball (4) co-operates with a coaxial finger (6a) of a leaktight closure component (6) fitted on the side of the through hole of the bore (1c).

When the ball (4) is in contact with the finger (6a) it is remote from its seat (2e) allowing free flow of the hydraulic fluid via the channel (1a), the bore (2c) and the channel (1b). In contrast, when it is no longer in contact with the finger (6a), the ball (4) is forced towards the bottom of its seat (2e) by the spring (5), giving closure of the circuit towards the braking components of the back wheel or wheels (AR) as will be explained further on in the description.

For this purpose the fluid coming from the braking components of the front wheel or wheels (AV) is routed into the bore (1c) in the housing (1) between the two piston heads (2a) and (2b) defining a ring-shaped chamber. The spring (3), which is pre-stressed depending on the set pressure value selected, exerts a force on the piston head (2a) that presses the piston head (2b) of the cylindrical body (2) against closure component (6).

In this position (FIG. 6) the ball (4) is in contact with the finger (6a) of closure component (6) to free its seat (2c) allowing the free passage of the fluid via the channel (1a), the bore (2c) and channel (1b). It should be noted that the surface of piston head (2b) is provided with pins (2b1) capable of bearing on the head (6b) of the closure component (6) when the ball (4) abuts against the finger (6a) to allow free passage of the hydraulic fluid.

The operating of the pressure limiting device of the invention will now be examined. When the pressure (P1) exerted on the braking components of the front wheel or wheels is increased causing the preselected set value i.e. that of the pre-stresses of the spring (3), to be exceeded, the body (2) tends to withdraw, compressing the said spring (3) (FIG. 7). The ball (4) is no longer maintained by the finger (6a) such that it moves to close off the seat (2e), impelled by the spring (5). In this position (FIG. 7), pressure (P2) exerted on the braking components (F2) of the back wheel or wheels (AR) decreases in proportion to a rise in pressure in the braking components of the front wheel or wheels.

Figure 2:
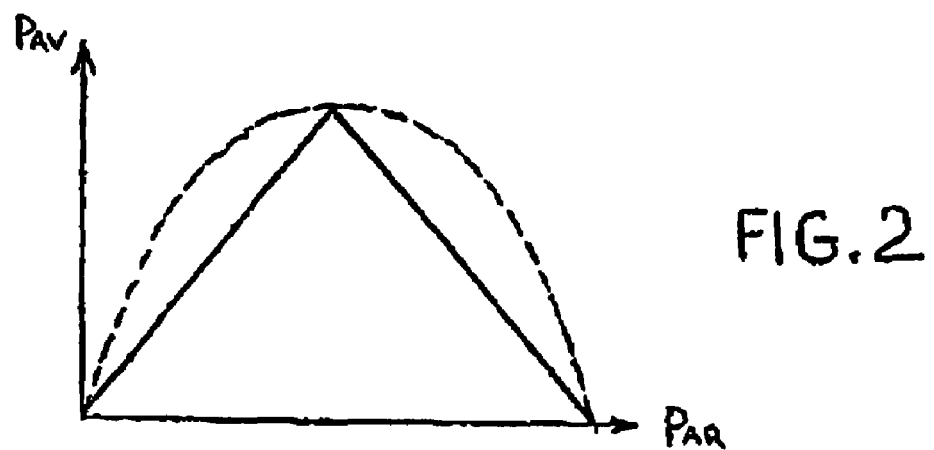
FIGS. 2, 3 and 4 show the curves obtained by the pressure limiting device in comparison with the ideal curve of FIG. 1 (shown as broken lines); the various curves obtained are dependent on the diameter of the piston heads of the movable body.

In a preferred embodiment of the invention based on this design, the piston head (2a) has a larger diameter than the other head (2b). In this configuration the bore (1c) in the housing defines two internal bearings (1c1) and (1c2) arranged coaxially and having different diameters matching those of the said pistons. In this configuration a curve is obtained close to that of the theoretical iso-adhesion curve (FIG. 2). There initially follows a rise in the pressure of the fluid flowing normally through the pressure limiting device via channel (1a), housing (2c) and channel (1b). Then, when the set pressure is reached the pressure decreases in the braking components of the back wheel or wheels in proportion to the rise in pressure in the braking components of the front wheel or wheels.

Figure 3:
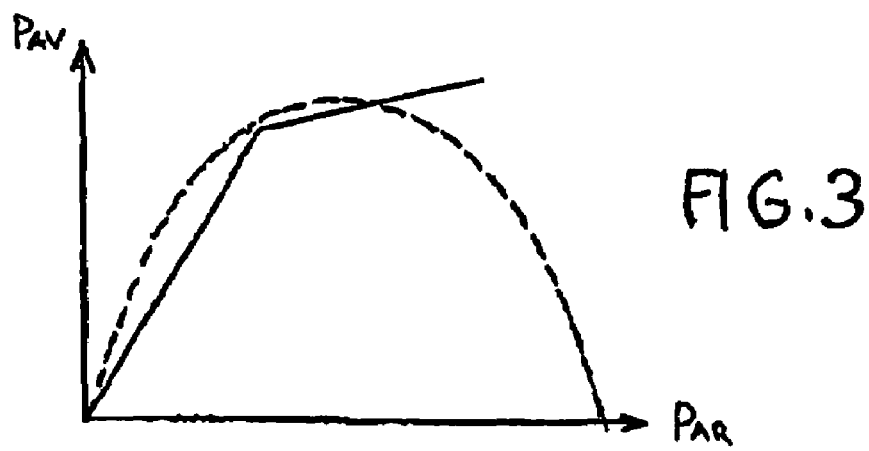

When the diameter of piston head (2a) is less than that of piston head (2b), a curve like that in FIG. 3 is obtained.

Figure 4:
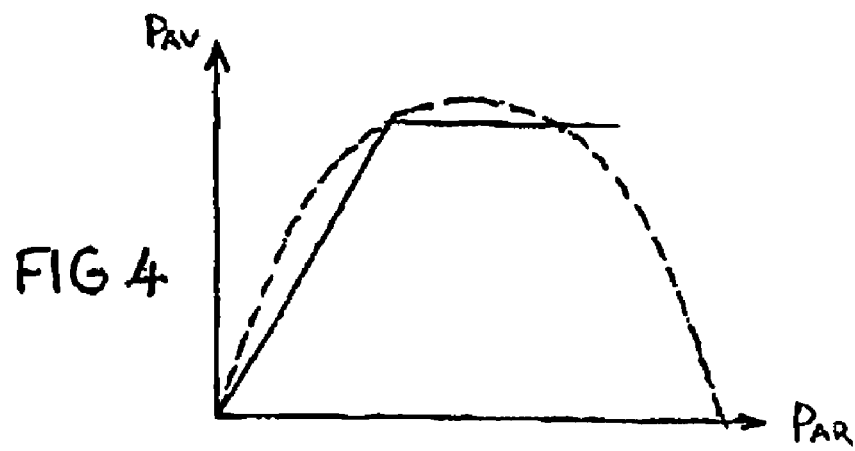

Finally, when the diameter of piston head (2a) is the same as that of piston head (2b), a curve like that in FIG. 4 is obtained.

Clearly in this configuration the bore (1c) in the housing defines an internal bearing that is of equal diameter along its entire length.

Advantageously, closure component (6) is fitted inside bore (1c) of the housing with the capacity to adjust its translation movement in order to make it possible to adjust the pre-stress on the spring (3), thereby concomitantly modifying the set pressure. For example, the closure component (6) consists of a cylindrical body having a threaded bearing (6c) capable of being screwed into an inside thread (If) at the entrance of the bore (1c). The body (6) is controlled by a thumb wheel (6d).

The advantages of the invention are clear from the description. Particular stress is laid on the fact that the pressure limiting device of the invention makes it possible to overcome the variation in the speed at which pressure rises and to cause this pressure to drop in the braking component circuit of the back wheels as a function of a preselected set pressure.

The invention claimed is:

1. Pressure limiting device for a hydraulic braking circuit of a vehicle, the device comprising:
   a leaktight housing having a bore, a first channel connected to the bore and hydraulically connected with braking components of a front wheel or wheels, and a second channel connected with the bore and hydraulically connected with braking components of a back wheel or wheels;
   a hollow cylindrical body having a piston head at each end defining with the housing bore an annular chamber therebetween, the cylindrical body mounted for sliding in a sealed manner in the bore, and said cylindrical body having a coaxial bore;
   an aperture in the cylindrical body wherein the coaxial bore of the cylindrical body is in fluid communication with the annular chamber;
   a ball positioned in the coaxial bore of the cylindrical body, the ball biased by a spring into contact with a ball seat having an aperture in fluid communication with the housing bore;
   a closure component positioned in a distal end of the bore of the housing, the closure component having a finger projection positioned to penetrate the ball seat aperture and contact the spring-biased ball; and
   an elastic component positioned in a proximal end of the bore of the housing and adapted to bias the position of the cylindrical body against the closure component based upon a set pressure value whereby the finger projection contacts and deflects the ball thereby exposing the ball seat aperture and allowing fluid from the first channel and the braking components of the front wheel to communicate with the second channel and the braking components of the back wheel or wheels;
   wherein, when a pressure of a fluid from the braking components of the front wheels exceeds the set pressure value, the cylindrical body deflects away from the closure component and the finger projection allowing the ball to seat in the ball seat and obstruct fluid flow from the first channel and the braking components of the front wheel to the second channel and the braking components of the back wheel or wheels, thereby limiting fluid pressure to the braking components of the back wheel or wheels.

2. Device as claimed in claim 1 wherein the fluid from the braking components of the front wheel or wheels is routed into the annular chamber and is sent to the braking components of the back wheel or wheels through a cavity between the hollow cylindrical body and the closure component.

3. Device as claimed in claim 2 wherein a surface of the hollow cylindrical body includes pins for bearing on said closure component when the ball abuts against the finger projection to allow the free passage of the fluid.

4. Device as claimed in claim 1 wherein the position of the closure component in the bore is adjustable, wherein a pre-stress on the elastic component can be varied, thereby concomitantly modifying the set pressure value.

5. Device as claimed in claim 1 wherein a first piston head of the hollow cylindrical body adjacent the elastic component comprises a larger diameter than a second piston head, opposite the first piston head, of the hollow cylindrical body.

6. Device as claimed in claim 1 wherein a first piston head of the hollow cylindrical body adjacent the elastic component comprises a smaller diameter than a second piston head, opposite the first piston head, of the hollow cylindrical body.

7. Device as claimed in claim 1 wherein a first piston head of the hollow cylindrical body adjacent the elastic component comprises a same diameter as a second piston head, opposite the first piston head, of the hollow cylindrical body.

* * * * *